Patented Mar. 27, 1923.

1,449,493

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS OF TREATING RUBBER AND PRODUCT OBTAINED THEREBY.

No Drawing.  Application filed May 23, 1921. Serial No. 471,934.

*To all whom it may concern:*

Be it known that I, SIDNEY M. CADWELL, a citizen of the United States, residing at Leonia, county of Bergen, State of New Jersey, have invented certain new and useful Improvements in Processes for Treating Rubber and Products Obtained Thereby, of which the following is a full, clear, and exact description.

This invention relates to processes for treating rubber. It is more particularly directed to processes for treating rubber employing hetero cyclic sulphur-containing compounds as vulcanizing ingredients, and products obtained thereby.

This application is a continuation in part of my application Serial No. 455,490, filed March 25, 1921.

One of the objects of the invention is to provide an efficient process of the kind described employing an accelerator of the type mentioned which may be combined with rubber by milling on hot rolls without danger of prevulcanization. Another object of the invention is to provide a process of the kind described in which vulcanization may be accomplished alone without the presence of sulphur or other vulcanizing agent employing a hetero sulphur-containing compound, or where sulphur as such or other vulcanizing agent is present acceleration of vulcanization may be accomplished, employing a smaller quantitiy of the compound. Another object of the invention is to provide a series of products having generally desirable physical characteristics such as high tensile strength, resistance to ageing, resistance to flexing, etc.

The invention accordingly consists of a process for treating rubber or similar material which comprises combining therewith a vulcanizing ingredient comprising the group $$\text{RCSM}$$

where R is part of a hetero cyclic radical, and M represents a radical $$\text{SCR, or CR,}$$

and vulcanizing the rubber.

In its preferred form the invention consists in compounding 100 parts of rubber, 10 parts of zinc oxide, 3 parts of sulphur, and .1 part of dipiperidylthiuramsulphide by milling in the usual manner and subjecting the mixture to 40 pounds steam pressure for 15 minutes when vulcanization is complete.

As an alternative to the above procedure 100 parts of rubber may be compounded by milling in the usual manner with 10 parts of zinc oxide, 3 parts of sulphur, and .1 part of dipiperidylthiuramdisulphide. Complete vulcanization occurs at 40 pounds steam pressure in approximately 15 minutes.

If it is desired to omit elemental sulphur from the mixture vulcanization may be carried out by increasing the quantity of thiuramdisulphide. As an example of such process 100 parts of rubber are compounded with 10 parts of zinc oxide and 5 parts of dipiperidylthiuramdisulphide on the rolls in the usual manner. The mixture cures completely under steam pressure of 40 pounds in approximately 2 hours.

The process described is simple. When the hetero cyclic thiuramsulphide is employed there is substantially no danger of prevulcanization upon milling in the usual manner on hot rolls. The hetero cyclic thiuramdisulphide will either accelerate or cause by itself vulcanization. The products have in general the desirable properties set forth above as an object of the invention.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for treating rubber which comprises combining therewith a vulcanizing ingredient comprising the group $$\text{RCSM}$$

where R is part of a nitrogenous hetero cyclic radical, and vulcanizing the rubber, 2. A process for treating rubber which comprises combining therewith a vulcanizing ingredient comprising the group $$\begin{array}{c} \text{RCSSCR} \\ \parallel \quad \parallel \\ \text{S} \quad \text{S} \end{array}$$

where R is part of a nitrogenous hetero cyclic radical, and vulcanizing the rubber.

3. A process for treating rubber which comprises combining therewith as an accelerator dipiperidylthiuramsulphide and a vulcanizing agent, and vulcanizing the rubber.

4. A process for treating rubber which comprises combining therewith as an accelerator dipiperidylthiuramdisulphide and a vulcanizing agent, and vulcanizing the rubber.

5. A process for treating rubber which comprises combining therewith dipiperidylthiuramdisulphide as a vulcanizing agent, and vulcanizing the rubber.

6. A vulcanized rubber derived from rubber or similar material combined with a vulcanizing ingredient comprising the group $$\begin{array}{c} \text{RCSM} \\ \parallel \\ \text{S} \end{array}$$

where R is part of a nitrogenous hetero cyclic radical.

7. A vulcanized rubber derived from rubber or similar material combined with a vulcanizing ingredient comprising the group $$\begin{array}{c} \text{RCSSCR} \\ \parallel \quad \parallel \\ \text{S} \quad \text{S} \end{array}$$

where R is part of a nitrogenous hetero cyclic radical.

8. A vulcanized rubber derived from rubber or similar material combined with dipiperidylthiuramsulphide.

9. A vulcanized rubber derived from rubber or similar material combined with dipiperidylthiuramdisulphide.

Signed at New York, New York, this 20 day of May, 1921.

SIDNEY M. CADWELL.